United States Patent [19]

Hollander, Jr.

[11] 4,364,474
[45] Dec. 21, 1982

[54] PACKAGES

[75] Inventor: Edward F. Hollander, Jr., Broomall, Pa.

[73] Assignee: John P. Glass, d.b.a. Cava Industries, Essington, Pa.

[21] Appl. No.: 950,174

[22] Filed: Oct. 10, 1978

Related U.S. Application Data

[63] Continuation of Ser. No. 720,084, Sep. 2, 1976, abandoned.

[51] Int. Cl.³ .................. B65D 77/04; B65D 77/12; B65D 77/38
[52] U.S. Cl. .................................... 206/219; 366/130
[58] Field of Search .............. 206/219, 484, 459, 534, 206/601, 602, 606, 620, 627, 629, 631, 524.3, 229; 366/130

[56] References Cited

U.S. PATENT DOCUMENTS

| | | | |
|---|---|---|---|
| 3,189,227 | 6/1965 | Hohler | 206/219 |
| 3,263,863 | 8/1966 | Hoag | 206/219 |
| 3,601,252 | 8/1971 | Sager | 206/219 |
| 3,638,786 | 2/1972 | Borecki | 206/219 |
| 3,651,615 | 3/1972 | Bohner | 206/219 |
| 3,847,279 | 11/1974 | Montgomery | 206/219 |
| 3,964,604 | 6/1976 | Rienntzell | 206/219 |
| 4,093,067 | 6/1978 | Hollander | 206/219 |

FOREIGN PATENT DOCUMENTS 697723 9/1953 United Kingdom ............... 206/219

Primary Examiner—Herbert F. Ross
Attorney, Agent, or Firm—Harding, Earley, Follmer & Frailey

[57] ABSTRACT

A package comprising a cylindrical plastic tube closed at each end by an ultrasonic band seal. The seal at one end has a sealed region which is narrower than any portion of the other seal whereby squeezing of the package produces an immediate one-shot dispensing of liquid contained therein by causing rupture of the narrow region of the seal. Various package forms include perpendicularly arranged bands to provide a tetrahedral shape, a tab extending beyond one seal to provide identification of the contents of the package, notched seals providing a tear open package, and a multiple package construction in which one fluid containing tube is contained within another.

4 Claims, 33 Drawing Figures

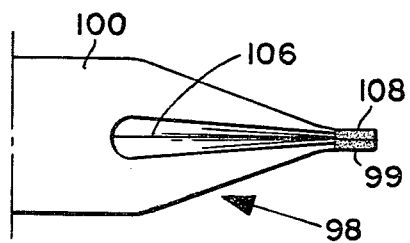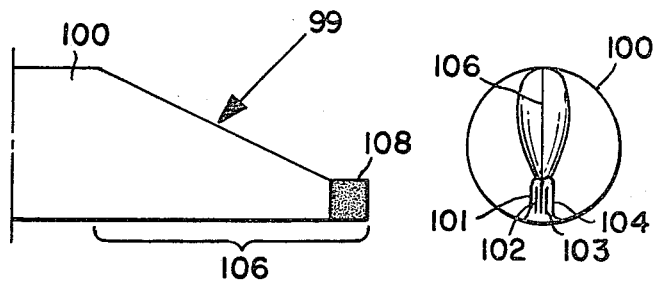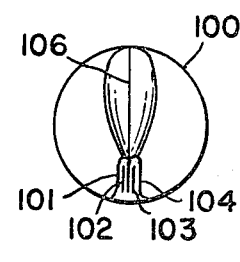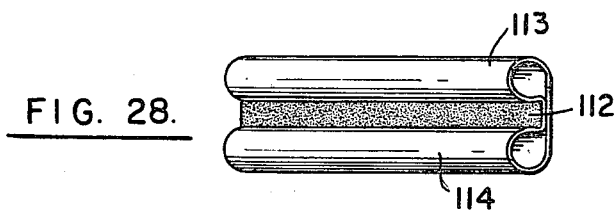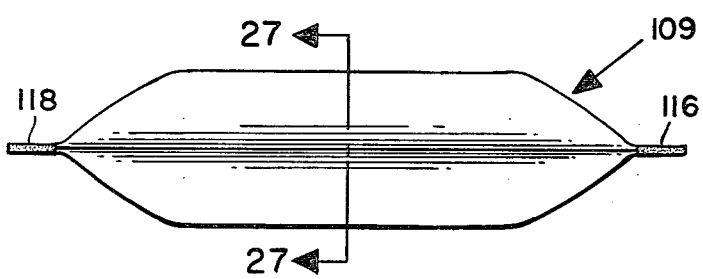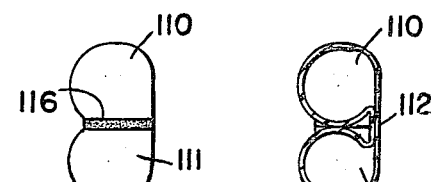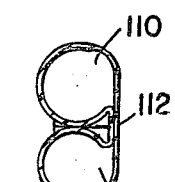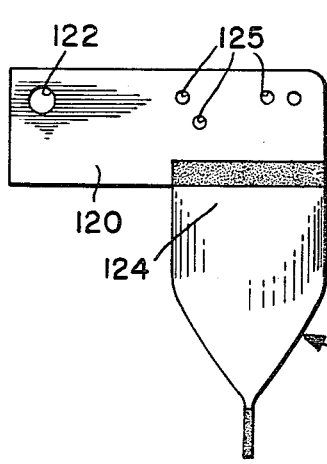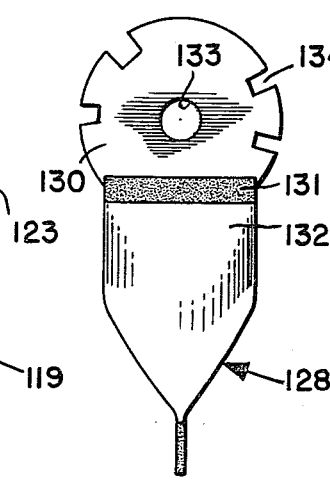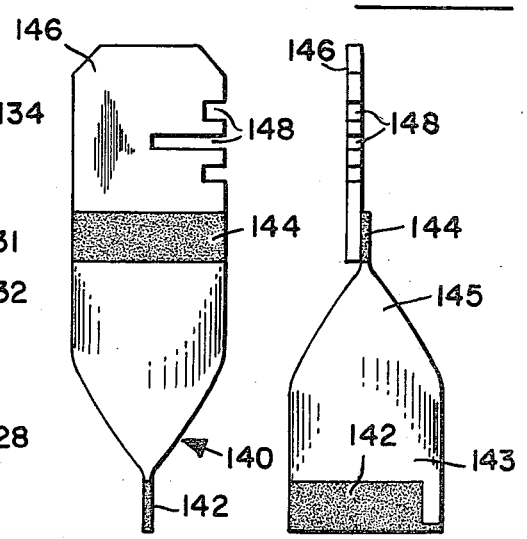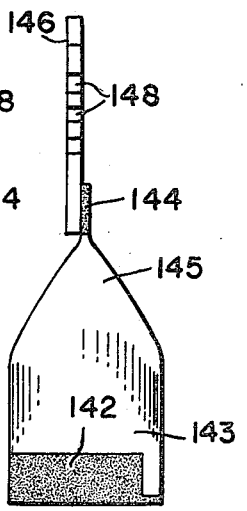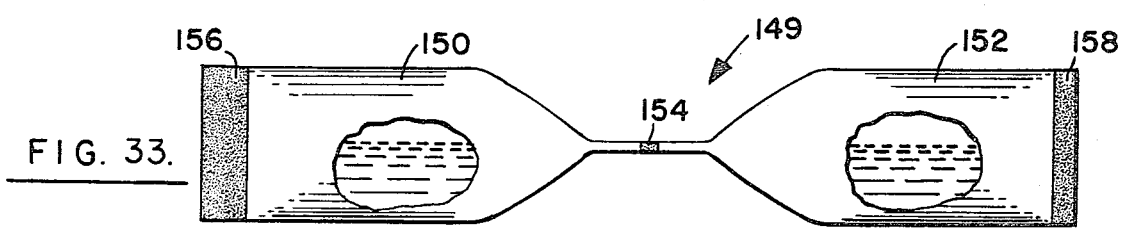

PACKAGES

This is a continuation of application Ser. No. 720,084, filed Sept. 2, 1976, now abandoned.

BACKGROUND OF THE INVENTION

One-shot dispensing packages for liquids or the like have already been provided. A commonly used form is the tetrahedral shaped cream dispensers in use today in coffee shops. Typical of the prior art packages are those disclosed in U.S. Pat. Nos. 1,527,659; 2,257,823; 2,430,995; 3,060,653; 3,070,927; 3,206,908; 3,210,908; 3,282,020; 3,353,328; 3,692,613; and 3,791,570.

The prior art packages are not entirely satisfactory. It is an object of this invention to provide an improved package which:

1. Is opened by using only one hand.
2. Is not sealed by a heat sealing procedure, which seals are not entirely reliable.
3. Is inexpensive to manufacture.
4. Provides that the product contained within the packages is visible to the user.
5. Permits accurate control of the bursting force of the package seal.
6. Is easily provided with dating or identifying means.
7. Controls the quantity of the package contents.
8. Does not employ glue to seal food or drugs which makes sterility control difficult or impossible.

SUMMARY OF THE INVENTION

The package in accordance with the invention overcomes the above-discussed problems of the packages of the prior art. Briefly stated, a package in accordance with the invention comprises a cylindrical plastic tube having ends which are closed by ultrasonic seals extending transversely across the tube. A first end seal has a sealed region which is narrower than any portion of a second seal so that the application of a compressive force to the exterior of the tube causes the fluid in the tube to rupture the first seal at this narrow sealed region for the immediate one-shot dispensing of the contents of the tube.

By reason of its construction, the package in accordance with the invention has controlled rupture properties. It is economical to manufacture, and may be made with controlled volume, weight, and count of its contents. The package may be made sterile or biodegradable, has no size limitations, and may be made uniformly. Also, by reason of the use of a clear plastic, the product within the container is visible to the user.

The package in accordance with the invention has use in many fields, such as medicine, law enforcement, manufacturing of machine parts and ball bearings, agriculture, dispensing machines, maintenance, military, inventory control, dentistry, cosmetics, survival, food storage, lubrication, patent medicines, and rubber products.

BRIEF DESCRIPTION OF THE DRAWINGS

FIG. 22 is a fragmentary top plan view of another end construction for a package in accordance with the invention;

FIG. 23 is a view in elevation of FIG. 22;

FIG. 24 is an end view of FIG. 23;

FIG. 25 is a top plan view of a multiple chamber package in accordance with the invention;

FIG. 26 is an end view of the package shown in FIG. 25;

FIG. 27 is a section taken on lines 27—27 of FIG. 25;

FIG. 28 is a view illustrating an intermediate stage in the construction of the package shown in FIG. 25;

FIGS. 29 and 30 are views of packages in accordance with the invention provided with a tab for the hanging of the package and codes for use in identifying the contents of the package;

FIG. 31 is a top plan view of another package in accordance with the invention provided with a card for use in identifying the package;

FIG. 32 is a side view of the package shown in FIG. 31; and

FIG. 33 is a view in elevation of a multiple package construction in accordance with the invention.

DETAILED DESCRIPTION OF THE PREFERRED EMBODIMENTS

Figure 1:
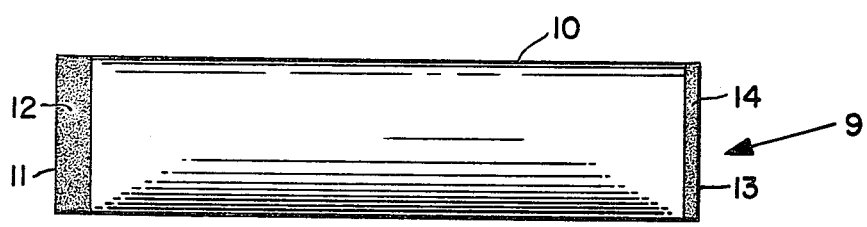
FIG. 1 is a top plan view of a package in accordance with the invention.
Figure 2:
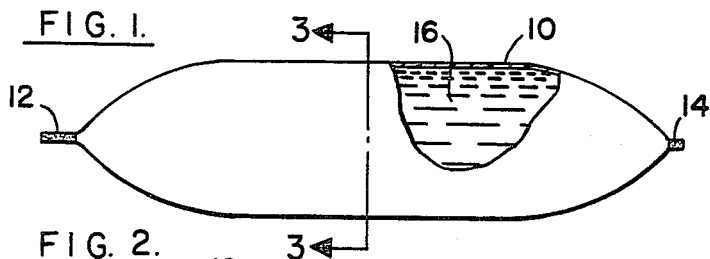
FIG. 2 is a view in elevation of the package shown in FIG. 1.
Figure 3:
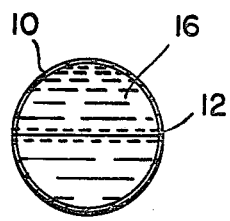
FIG. 3 is a section taken on lines 3—3 of FIG. 2.

One form of package 9 in accordance with the invention is shown in FIGS. 1 to 3 and comprises a cylindrical plastic tube 10 which preferably is formed from an extruded plastic giant size tube such as a soda straw. One end 11 of the tube 10 is closed by an ultrasonic seal 12 applied along a wide band extending transversely across the tube 10. The other end 13 of the tube is closed by an ultrasonic seal 14 applied along a narrow band extending transversely across the tube 10. End 13 is the "nozzle" end of the tube 10 through which its contents are ejected. The tube 10 provides an internal chamber 16 between the band seals 12 and 14 for containing the product to be packaged. The seals 12, 14 are made very accurately and reliably by ultrasonic sealing methods.

Ultrasonic sealing or welding is a known technique. Briefly, ultrasonic sealing involves the supply of power (such as 3 KW at 25 KC) to a transducer horn which cooperates with an oppositely positioned anvil. The material to be sealed or welded together is placed between the horn and the anvil and the horn is moved toward the anvil to contact the material with a predetermined pressure. In the formation of the band seals 12 and 14, the end of the horn has a rectangular profile corresponding to the shape of the seal itself and the end of the cylinder 10 is placed between the end of the horn and the anvil whereupon the anvil is moved into contact with the cylinder end to form the seal by a welding type of action.

The package of FIGS. 1 to 3 may be used to package various liquids such as greases, oils, shoe polish, hair tonic, salves, lotions, bug repellants, suntan oil, or any other oily or greasy liquid. To this end, the seals of the package are designed such that upon the application of a compressive or squeezing force to the exterior of the tube 10, the hydrostatic pressure of the fluid in the chamber 16 ruptures the narrow band seal 14, which is the weaker seal, for the immediate one-shot dispensing of the fluid contained in the chamber 16. It will be apparent that the contents of the package pop out at the narrow seal end 13 for a one-shot type of dispensing action which may be achieved by squeezing the package between the fingers of one hand. It is not necessary to use more than one hand to achieve this dispensing action.

The package of FIGS. 1 to 3 may be designed to achieve other advantageous features. For example, the plastic tube 10 may be made transparent so that the contents of the package are visible to the user. Also, the tube 10 may be made from a polyethylene straw such as those straws in common use today, so the package may be made very inexpensively and has a small diameter and a relatively rigid construction.

Figure 4:
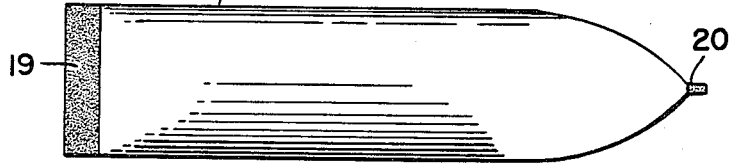
FIG. 4 is a top plan view of a tetrahedral shaped package in accordance with the invention.
Figure 5:
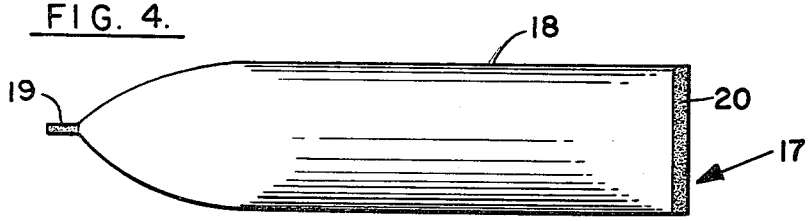
FIG. 5 is a view in elevation of the package shown in FIG. 4.
Figure 6:
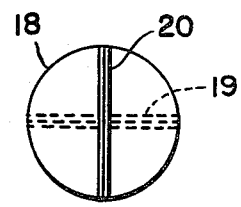
FIG. 6 is an end view of the package shown in FIG. 5.
Figure 7:
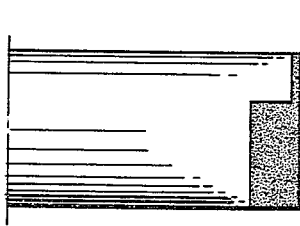
FIGS. 7 to 13 are fragmentary views of end portions of packages in accordance with the invention illustrating different ultrasonic weld configurations.
Figure 8:
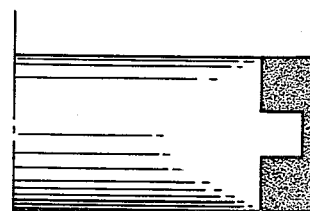
Figure 9:
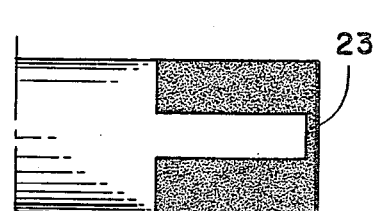
Figure 10:
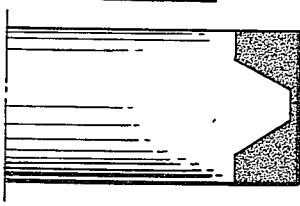
Figure 11:
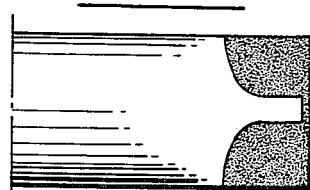
Figure 12:
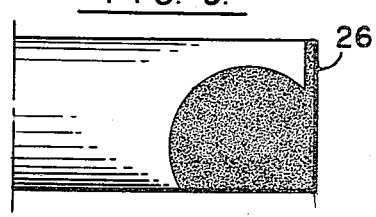
Figure 13:
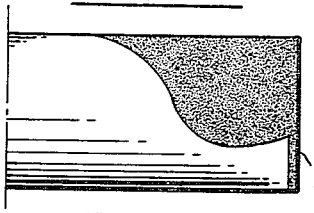

In FIGS. 4 to 6 there is shown another package 17 of the invention which is very similar to that shown in FIGS. 1 to 3 with a tube 18 sealed at its ends by band seals 19 and 20. The only essential difference between the package 17 of FIGS. 4 to 6 and the package 9 of the FIGS. 1 to 3 is that in package 17 the band seals are located in planes perpendicular to one another, instead of in the same plane as in package 9, so that package 17 has a tetrahedral shape.

In FIGS. 7 to 13 there are shown various ultrasonic weld configurations at the "nozzle" end 13 of the package 9 i.e., the end which is ruptured to dispense the contents of the package. Each of the nozzle ends shown in FIGS. 7 to 13 comprises a sealed region which is narrower than any portion of the seal at the other or "non-nozzle" end of the package. In the package ends shown in FIGS. 7 to 13, there are provided weld portions having neck areas 21 to 27, which are narrower than the remainder of the seal at this nozzle end to provide a thin seal wall which ruptures when the hydrostatic pressure is raised within the package to exceed the strength of the neck area. The neck areas 21, 26 and 27 are located at one end of the transverse extent of the seal so that the contents of the package are dispensed at this end location. The neck areas 22, 23, 24 and 25 are located in the central region of the seals so that the contents of the package are dispensed along the axis of the package.

One of the features of the package in accordance with the invention is the provision of means for identifying the contents of the package. To this end, the non-nozzle end 29 of a package shown in FIG. 14 includes a tab 30 extending beyond band seal 32 which closes the non-nozzle end 29 of the package. The tab 30 comprises a flattened extension of the tube 34 forming the package and is closed by an ultrasonic band seal 36 extending across it. A plurality of dots 38 formed by ultrasonic sealing are arranged in a code to provide identification of the contents of the package.

In ultrasonic welding some energy fringing occurs where the horn touches the plastic. This fringing can be used to form a dot as is shown by the dots 38 in FIG. 14.

Figure 14:
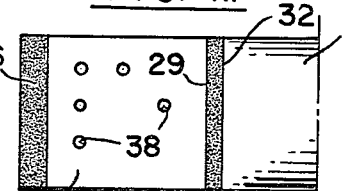
FIG. 14 is a fragmentary view of an end of one form of a coded package in accordance with the invention.
Figure 15:
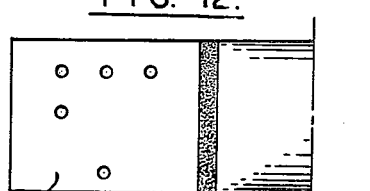
FIG. 15 is a fragmentary view of another form of coded package in accordance with the invention.

In FIG. 15 there is shown a package end which is essentially the same as that shown in FIG. 14 with the exception that a tab 39, similar to tab 30, is not provided with a second seal 36 at its extended end.

In order to make the marking system free of confusion, it is desirable that a Braille system of letters be used. The Braille system involves less confusion of letters such as B and E or R and K, etc., and is preferable for that reason.

Figure 16:
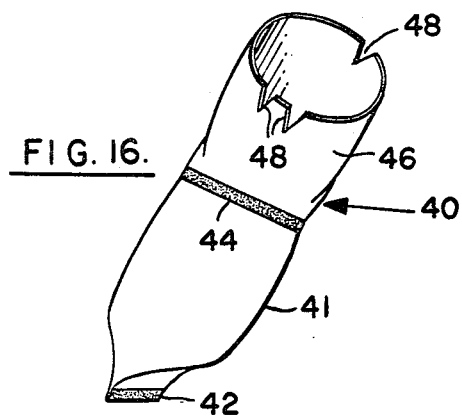
FIG. 16 is a view illustrating a tetrahedral shaped package provided with an identification tab at one end thereof.

In FIG. 16 there is shown another package 40 adapted for coded marking to indicate the contents of the package. In this form of the package, there is provided a tube 41 having perpendicular end seals 42 and 44 provoding a tetrahedral shape, and a tubular extension 46 extending beyond the end seal 44 and consisting of an open extension of the tube 41 from which the package 40 is made. A plurality of notches 48 are formed in the open edge of the extension 46 to provide a code for identifying the contents of the package 40.

Figure 17:
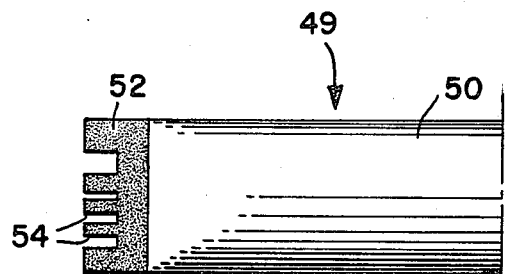
FIG. 17 is a fragmentary view of an end form of a package in accordance with the invention illustrating another type of coded construction.

Another form of coded package 49 in accordance with the invention is shown in FIG. 17 in which the package 49 is made of a tube 50 closed at one end by a relatively wide band ultrasonic seal 52. The outer edge of the seal 52 is provided with a plurality of notches 54 of different widths to provide a code to identify the contents of the package 49.

Figure 18:
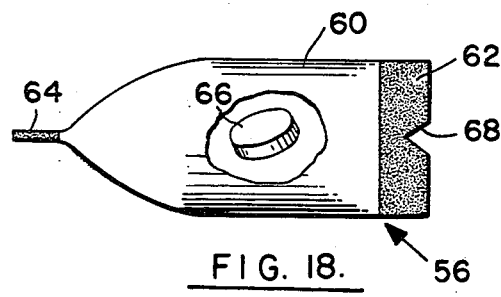
FIGS. 18 and 19 are views illustrating a tear-apart package in accordance with the invention.
Figure 19:
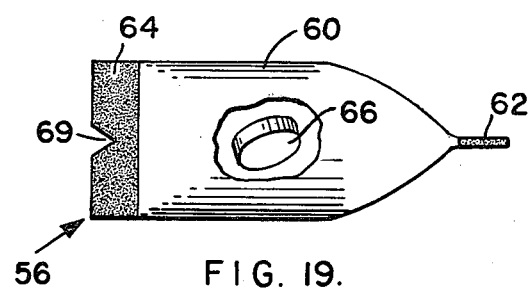

In FIGS. 18 and 19 there is shown a package 56 in accordance with the invention which is provided with a tear-open construction. The package 56 is essentially the same as package 17 shown in FIGS. 4 to 6. Thus, there is provided a tetrahedral package made from a plastic tube 60 closed at its ends by ultrasonic band seals 62 and 64 which are located in planes perpendicular to one another. The package 56 is adapted to contain a solid article such as a tablet 66. The band seals 62 and 64 are both made relatively wide and are provided with a centrally located V-shaped notches 68 and 69. By this construction, the notches 68 and 69 form the start of a tear across the width of the band seals 62 and 64. A user of the package 56 opens it by grasping it in a manner to cause a tear to move inwardly from the inner edge of one of the V-shaped notches 68 or 69.

Figure 20:
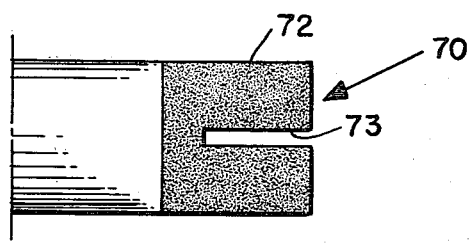
FIG. 20 is a fragmentary view illustrating a modified end form for a tear-apart package in accordance with the invention.

In FIG. 20 there is shown a modified form of the tear-apart package 70 in accordance with the invention. In this form of the invention, the band seal 72 of the package 70 is provided with an elongated slot 73 extending across the width of the band seal 72. The slot 73, like the V-shaped notch 68, forms a start of a tear across the width of the seal 72 and is used to conveniently tear apart the package 70 to gain access to its contents.

Figure 21:
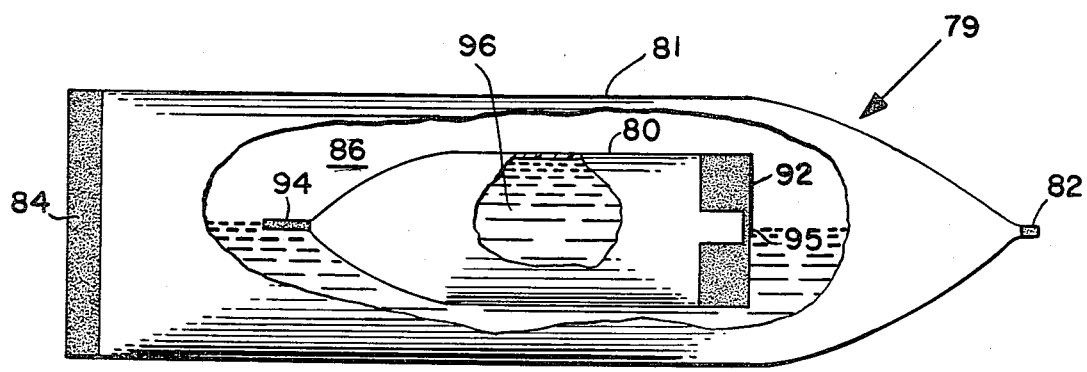
FIG. 21 is a view of a multiple package construction in accordance with the invention.

In FIG. 21 there is shown a multiple package 79 in which one fluid containing tube 80 is contained within another 81. Tube 81 has a construction similar to that of the package 17 shown in FIGS. 4 to 6, and is sealed at its ends by band seals 82 and 84 which define an internal chamber 86. The band seals 82 and 84 are located in planes perpendicular to one another so that the package 79 has a tetrahedral shape. The band seal 82 is the narrow band seal that is ruptured during the opening of the package. Tube 81 is of a relatively large diameter and is adapted to contain second tube 80 also of a tetrahedral shape. The tube 80 is contained within the chamber 86 along with a suitable liquid which may partially fill the chamber 86. The ends of the tube 80 are provided with seals 92 and 94. Seal 92 is similar to the seal shown in FIG. 8 and is provided with a thin neck area 95. The tube 80 contains a fluid 96 in its internal chamber. The seals 82 and 84 are adapted to withstand hydrostatic pressure without breaking at a level greater than the hydrostatic pressure that would break the seal 92 of the inner tube 80.

In using the package 79 shown in FIG. 21, the inner tube 80 may be broken by applying a compressive or squeezing force. This may be applied by collapsing the outer walls of the tube 81 and applying the pressure to the tube 80 to cause the inner tube 80 to rupture at the neck area 95 to dispense the liquid 96 into the internal chamber 86 of the outer tube 81 thereby causing the liquid 96 to mix with the liquid 88. Subsequently, the mixed liquids may be dispensed from the tube 81 by rupturing the narrow band seal 82 by applying a compressive force to the tube 80.

In FIGS. 22 to 24 there is shown a package 98 in accordance with the invention having a stiff end 99. This package 98 includes a tube 100 with four overlapped wall portions 101–104 having a length approximately one quarter of the circumference of the tube 100. These wall portions 101 to 104 are formed by folding a closed end of the tube about a longitudinally extending fold line 106 on the tube circumference to produce the four overlapped wall portions 101–104 shown in the drawings. An ultrasonic seal 108 is then applied to seal the four overlapped wall portions 101–104.

In FIGS. 25, 26 and 27 there is shown a package 109 in accordance with the invention which includes a pair of longitudinally extended chambers 110, 111 for containing fluids or the like. This package 109 is made by first sealing a tubular soda straw axially as is shown in FIG. 28 to form seal 112 and a pair of tubular portions 113 and 114. The ends of the article shown in FIG. 28 are then compressed together and are ultrasonically sealed at seals 116 and 118 to form package 109. This package 109 provides two elongated chambers 110 and 111 for containing liquids or the like. This construction permits the package 109 to contain two different liquids, one contained in each of the chambers 110 and 111.

In FIG. 29 there is provided a package 119 in accordance with the invention which includes a tab 120 provided with a hole 122 for use in hanging the package. Package 119 is of the tetrahedral shape shown in FIGS. 4 to 6 and includes tab 120 that is secured to the seal 123 at the non-nozzle end 124 of the package. Tab 120 is also provided with a plurality of small identity holes 125 to provide a code identifying the contents of the package.

In FIG. 30 there is shown a package 128 similar to package 119 shown in FIG. 29 except that there is provided a tab 130 that is secured to the seal 131 at the non-nozzle end 132 of the package and has a circular or disc-like configuration. A hole 133 is formed in the center of the tab 130 for use in the hanging of the package. A plurality of notches 134 are formed in the periphery of the tab 130 for use in providing a code for the identification of the contents of the package.

Tabs 120 of FIG. 29 and 130 of FIG. 30 lend themselves to being fastened to other articles by tape or staples.

The packages 119, 128 shown in FIGS. 29 and 30 have particular application to administering medication where it is important that the proper medication is given to a patient. Thus, the code applied to the tabs may be compared with the code on a similar tab associated with a patient identification card.

In FIGS. 31 and 32 there is shown a tetrahedral shaped package 140 having seals 142 and 144. The seal 142 at the nozzle end 143 is similar to seal 21 shown in FIG. 7. The seal 144 at non-nozzle 145 end is a straight band seal. Attached to the package 140 at the seal 144 is a relatively stiff card 146 having a heavy gauge similar to credit card stock in general use today. The card 146 is generally rectangular in shape and is provided with a plurality of notches 148 that provide a code for the identification of the contents of the package 140. Notches 148 have varying depths.

In FIG. 33 there is shown a package 149 in accordance with the invention comprising a pair of tetrahedral packages 150 and 152 joined at an ultrasonic seal 154 closing adjacent ends of the packages 150 and 152. The outer ends of the packages 150 and 152 are closed by band seals 156 and 158, lying in the same plane, which plane is perpendicular to the plane containing the joining seal 154. Each of the packages 150 and 152 contains a liquid that partially fills its chamber.

Seal 154 is narrower than seals 156, 158 so that pressure on package 149 initially ruptures seal 154 to mix the liquids together inside the container 149 to maintain sterility of its contents. Increased pressure on package 149 ruptures nozzle seal 158 to dispense the mixed liquids from the package 149.

I claim:

1. A package comprising an inner cylindrical tube of flexible material,
    a first end of said tube being closed by a first ultrasonic seal extending transversely across the tube,
    a second end of said tube being closed by a second rupturable ultrasonic seal extending transversely across the tube,
    said tube providing an internal chamber between said seals for containing a fluid,
    an outer cylindrical tube having a diameter larger than said inner tube,
    said outer tube containing a fluid and said inner tube being contained within said outer tube separate from the sealed ends of the outer tube,
    a first end of said outer tube being closed by a permanent ultrasonic seal extending transversely across the tube,
    a second end of the outer tube being closed by a rupturable ultrasonic seal,
    the rupturable seal of the inner tube being weaker than the rupturable seal of the outer tube,
    whereby the contents of the inner tube may be discharged into the interior of the outer tube for mixture with the contents of the outer tube by squeezing the outer tube with sufficient force to rupture the rupturable seal of the inner tube but not the rupturable seal of the outer tube, and
    whereby the mixture may be dispensed by squeezing the outer tube with sufficient force to rupture the rupturable seal of the outer tube.

2. A package according to claim 1 wherein the flexible material is transparent.

3. A package according to claim 1 or 2 wherein the flexible material is a plastic material.

4. The packages of claims 1 or 2 including the seals of the outer tube being located in planes perpendicular to one another so that the outer tube has a tetrahedral shape, the rupturable seal of said outer tube being in the form of a band extending transversely across the tube and having a neck area that is narrower than the remainder of said band, said neck area being located in the central region of said band generally symmetrical with respect to the longitudinal axis of the package so as to dispense the mixed contents of the package along said axis of the package.

* * * * *